Sept. 10, 1968   J. T. McNANEY   3,400,992
COPLANAR LIGHT BEAM DEFLECTION AND SELECTION APPARATUS
Filed June 9, 1965

INVENTOR.
Joseph T. McNaney

United States Patent Office 3,400,992
Patented Sept. 10, 1968

3,400,992
COPLANAR LIGHT BEAM DEFLECTION AND SELECTION APPARATUS
Joseph T. McNaney, 8548 Boulder Drive,
La Mesa, Calif. 92041
Filed June 9, 1965, Ser. No. 462,494
2 Claims. (Cl. 350—160)

ABSTRACT OF THE DISCLOSURE

Specified herein is an electro-optical light beam deflection system utilized primarily for effecting deflections, and thereby axial alignments, of light beams converging on and crossing an optical axis of the system from a plurality of vertical and horizontal off-axis positions. More particularly this deflection system is designed to deflect the beams from their initial convergent paths about a point along the axis which is intersected by a common plane of the system whereby any one of the beams will be deflected, before crossing the axis, and directed along the axis. In a principal embodiment utilizing this system each of the plurality of beams is made to assume the shape of an individual character so that predetermined character shaped beams may be directed along the axis, selected through a limiting aperture and thereupon directed to the surface of a display medium.

---

This invention relates to a coplanar light beam deflection and selection apparatus for use in information display systems wherein the object is to display selectively character shaped light beams derived from a beam forming member. Moreover, this invention relates to apparatus of this type which utilizes light beam deflection means comprised of ferroelectric crystals since it is an object of this invention to perform light beam selections at extremely high speeds.

Another object of this invention is to provide a high speed beam deflection means that is capable of directing any one of a plurality of light beams along a common axis which are converging on a focus point on the axis from a plurality of off-axis positions.

Another object is to utilize aperture limiting means along the axis in cooperation with the deflection means to block passage of all light beams except the beam being directed along the axis.

Another object of the invention is to effect controlled divergence of beams from the common axis upon admission of the beams through the limiting aperture, whereupon the light beams will be positioned on a display medium.

It is, of course, an object of the deflection apparatus to direct a selected beam along a path parallel with the common axis before reaching a plane of the limiting aperture and also before reaching the divergence means.

Other objects and advantages will be apparent from the following description when read in connection with the accompanying drawing, in which.

Figure 1:
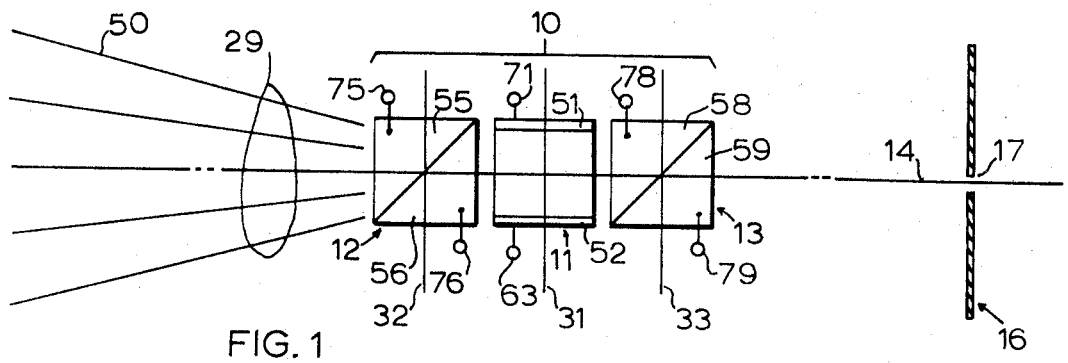
FIGURE 1 is a schematic drawing of the beam deflection and selection apparatus as viewed from one direction.
Figure 2:
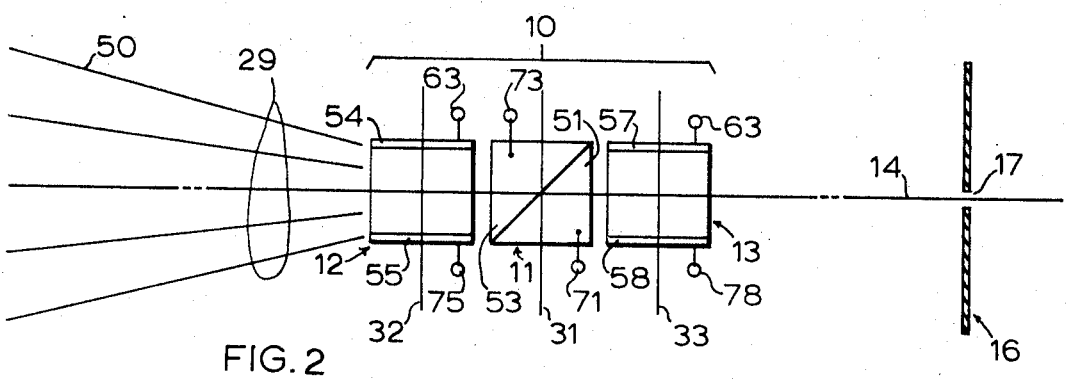
FIGURE 2 is another schematic drawing of the beam deflection and selection apparatus as viewed from another direction, or 90° from the viewing of FIGURE 1.

Referring now to FIGURES 1 and 2, the light beam deflection means 10 of the invention is comprised of first, second and third electro-optic ferroelectric crystals 11, 12 and 13, respectively. The deflection means 10 is positioned about an optical axis 14 of the display apparatus so that an array of light beams converging on the axis 14 will enter the second crystal 12 and pass therethrough, and through the crystal 11 (being identified as a first crystal 11) and the crystal 13, and then toward an opaque mask 16 having an aperture 17 therein in optical alignment with the axis 14. On opposite surfaces of each crystal there is deposited electrode means for applying the influence of an electrical potential selectively across each crystal, substantially perpendicular to the optical axis 14, to effect changes therein which alter the index of refraction. A point about which light beam deflections will take place in the first crystal 11 coincides with a plane 31 perpendicular to the axis 14; a similar point of the second crystal 12 coincides with a plane 32; and a similar point of the third crystal 13 coincides with a plane 33. Upon the application and control of electrical potentials across the assembly 10 the changes that occur in the refractive index will be utilized to effect coplanar-like deflections of light beams converging on a focus point, or beam cross over point, along the axis with coincide with the plane 31.

Figure 3:
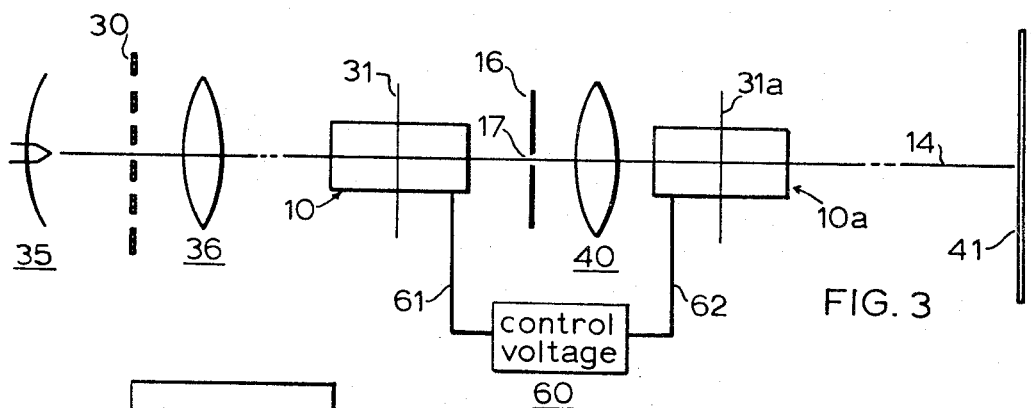
FIGURE 3 is a schematic drawing of a system embodiment of the invention extending from a source of light to a display medium.
Figure 4:
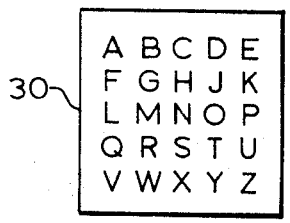
FIGURE 4 represents a plan view of a light beam forming member as used in the above illustrations.

Referring to FIGURES 3 and 4, the converging light beams 29 are derived from a beam forming member 30, or matrix, which is an opaque mask having therein an array of character shaped light transparent areas in the form of letters A, B, C, etc. The matrix 30 is positioned on the axis 14 so that the letter N therein is aligned with the axis. The remaining letters in the matrix 30 will, of course, be off axis 14. The array of characters in the matrix 30 is flooded with light from a light source 35 so that all of the characters therein will appear as light beams simultaneously on the opposite side of the matrix 30, and an optical means, or lens 36, will cause the light beams 29 to converge on the axis 14 about the plane 31. Controlled changes in the index of refraction of the various crystals of the assembly 10 will effect coplanar-like selectively horizontal and vertical deflections of the beams 29 so that individual shaped beams may be directed along a path parallel with the axis and through the aperture 17. In addition to focusing the beams 29 on the axis 14 as indicated, the lens system 36 will also be utilized to control the imaging and size of the matrix 30 characters at the plane of the mask 16. Since the character being selected through the aperture 17 will be of a predetermined size, a post-aperture lens system 40 will be utilized to control the imaging and size of the characters on a display medium 41. Intermediate the lens 40 and the medium 41 a second electro-optic ferroelectric crystal deflection means 10a will be used to control the positioning of the characters on the display medium. The display medium 41 may be in the form of a stationary, or movable, viewing screen or record medium, and in the form of a light reflector, or radiation sensitive media.

Light beams from the matrix 30 will be converging on the axis 14 from various directions, with the exception of the letter N which is on the axis 14. In order to direct, selectively, the remaining beams along a path parallel with the axis 14, the letters C, H, S and X will have to be subjected to vertical deflections; the letters L, M, O and P will have to be subjected to horizontal deflections; and the remaining letter shaped beams will have to be subjected to combinations of vertical and horizontal deflections. The object of having to direct the individual shaped beams along a path parallel with the axis 14, of course, is related to the problem of accurately selecting the beams from a flooded matrix of characters and then accurately registering the selected characters on the display medium. Accurate selection of characters is accomplished by having a desired character beam on the axis 14 upon entering the aperture 17, and accurate registering of the characters is accomplished by having a desired character beam on the axis 14 upon entering the second deflection system 10a. An important object of the invention, therefore, is to provide a ferro-electric crystal deflection assembly capable of coplanar-like vertical and horizontal deflections in order to direct, selectively, the converging beams from the matrix 30 along a path parallel with the axis.

The necessary vertical deflections of the C, S, H and X shaped beams will be effected by the first crystal 11, however, the remaining beams of the array will be deflected entirely, or partly, by the first crystal 11 in combination with the second and third crystals 12 and 13, or, by the combined effects of the second and third crystals 12 and 13. For example, the path 50 in FIGURES 1 and 2 may represent the path along which the A shaped beam is converging on the axis 14 adjacent the plane 31. Referring now to FIGURE 2, in order to re-direct this A shaped beam along a path parallel with the axis 14 the necessary vertical deflection will be effected about the axis 14 and plane 31 intersection adjacent the crystal 11, and will be effected by the crystal 11. Referring now to FIGURE 1, the necessary horizontal deflection of this A shaped beam will be accomplished in two stages; first, about the axis 14 and plane 32 intersection adjacent the crystal 12, and by the deflection effects of the crystal 12, and then, about the axis 14 and plane 33 intersection adjacent the crystal 13, and by the deflection effects of the crystal 13. The second crystal 12 deflection effects will shift the path of the A shaped beam to a path directing it toward the axis 14 and plane 33 intersection, whereupon the deflection effects of the third crystal 13 will redirect the beam along the axis 14. The combined effects of the first, second and third crystals will direct the A shaped beam along a path parallel with the axis 14. If the deflection effects of only the second crystal 12, or only of the third crystal 13, were utilized to direct the A shaped beam through the aperture 17, then this beam would not be on the axis 14 upon reaching the second deflection system 10a. Therefore, the combined effects of both the second and third crystals 12 and 13 are required to align a character shaped beam with the axis 14 at the aperture 17 and at the deflection system 10a.

The electro-optic ferroelectric crystals referred to in this invention are preferably composed of a single crystal of barium titanate, or other crystalline materials having similar electro-optic characteristics. Each of the beam deflector units, 11, 12 and 13, of the deflection means 10, as illustrated in FIGURES 1 and 2, is comprised of a pair of prism shaped crystals supported side-by-side to function as a unit, and on opposite surfaces of each prism there is deposited an electrode means or electrically conducting layer of material for applying a voltage thereto. The pair of prisms 11 are provided, respectively, with electrodes 51 and 53 on the one side thereof and a common electrode 52 on the opposing side thereof. The pair of prisms 12 are provided, respectively, with electrodes 55 and 56 on the one side thereof and a common electrode 54 on the opposing side thereof. The pair of prisms 13 are provided, respectively, with electrodes 58 and 59 on the one side thereof and a common electrode 57 on the opposing side thereof. Common terminals 63 of the common electrodes, and terminals 71, 73, 75, 76, 78 and 79, respectively, of electrodes 51, 53, 55, 56, 58 and 59, are connected to a source of control voltages 60, as indicated in FIGURE 3, through interconnecting cables 61. In operation, the desired light beam deflection effects are established in the deflection means 10 upon the application of predetermined electric fields across predetermined prisms therein.

As hereinbefore stated, an object of this invention is to provide in the light beam deflection means 10 coplanar-like deflections of character shaped beams converging on the optical axis 14 from a plurality of vertical and horizontal off-axis positions. The particular shapes and positions of these beams are exemplified in the FIGURE 4 showing of the matrix 30, wherein only the letter N shaped beam has been described as being positioned on the optical axis 14 in the FIGURE 3 system embodiment of the invention. The entire array of beams, each given a particular shape by reason of the character shaped transparent areas of the matrix 30, is directed at, and thereby cross, the axis 14 at the deflection plane 31. In order to direct individual ones of the array of beams along the axis 14 the entire array is deflected about the axis 14 and plane 31 intersection. Since it is desirable, but not entirely possible, to effect both the vertical and horizontal beam deflections at the deflection plane 31, deflections of certain ones of the off-axis beams, vertical for example, effected by the electro-optic unit 11, will occur at the axis 14 plane 31 intersection, and deflections of beams from the horizontal off-axis positions, effected by the electro-optic units 12 and 13, will occur about the axis 14 plane 31 intersection. However, the combined effects of the units 11, 12 and 13 produce vertical and horizontal beam deflections which align individual beams along a path parallel with and on the axis 14. The combined effect can be considered as coplanar vertical and horizontal beam deflections, but have been referred to herein as coplanar-like deflections in that they are effected about the same axis 14 plane 31 intersection and not precisely thereat.

To explain more fully, under operating conditions whereby the material of both prisms in each of the units 11, 12 and 13 have the same index of refraction, the converging light beams will be unaffected at the interface of the side-by-side prisms of each unit, whereby only the N shaped beam will continue along the axis 14 beyond the deflection means 10. The placement of C, H, S, X shaped beams on the axis will occur about the axis 14 plane 31 intersection under the influence of voltages applied to the unit 11. To effect an axial alignment of either the C or H shaped beams, voltages will be applied accordingly to the unit 11 whereby at the interface of the prisms therein the light beams will pass from a prism having one index of refraction to another having a correspondingly lower index of refraction. To effect an axial alignment of either the S or X shaped beams, voltages will be applied accordingly to the unit 11 whereby at the interface of the prisms the light beams will pass from a prism having one index of refraction to another having a correspondingly higher index of refraction.

Displacements of L, M, O, P shaped beams from their initial paths and onto the axis will take place independently at the junction of the axis 14 and the plane 33, but only after receiving an initial deflection in the area of plane 32. Although these beam deflections occur before and after the axis 14 plane 31 intersection they do in fact take place about the latter intersection. To effect an axial alignment of either the L or M shaped beam, voltages will be applied accordingly to units 12 and 13 simultaneously. At the interface of the prisms in unit 12 the light beams, not having reached the axis 14 of course, will pass from a prism having one index of refraction to another having a correspondingly lower index of refraction, whereby the desired beam will be directed at the junction of axis 14 and plane 33. At the interface of the prisms in the unit 13 the light beams will pass from a prism having one index of refraction to another having a correspondingly lower index of refraction whereby the desired beam will be aligned with the axis 14. To effect an axial alignment of either the O or P shaped beam, voltages will be applied accordingly to units 12 and 13 simultaneously. At the interface of the prisms in unit 12 the light beams, not having reached the axis as yet, will pass from a prism having one index of refraction to another having a correspondingly higher index of refraction, whereby the desired beam will be directed at the junction of axis 14 and plane 33. At the interface of the prisms in the unit 13 the light beams will pass from a prism having one index of refraction to another having a correspondingly higher index of refraction whereby the desired beam will be aligned with the axis 14. To effect an alignment of any of the remaining letter shaped beams with the axis the beam deflection capabilities of the units 11, 12 and 13 will be utilized in a combined manner and similar to that set forth.

Depending upon the application of the coplanar light beam deflection and selection apparatus of this invention, the light source 35 may be an optical maser or laser. Or, the coherent, collimated light of a gallium arsenide diode may be utilized with a high degree of operating efficiency and output intensities. And also, whatever the nature of the light source or the wavelength and intensity requirements thereof, means associated with the source will have to be provided for turning the light therefrom on and off at the proper times.

The particular embodiments of the invention illustrated and described herein are illustrative only and the invention includes such other modifications and equivalents as may readily appear to those skilled in the art within the scope of the appended claims.

I claim:

1. Electro-optic light beam deflection means, positioned about a point on an optical axis thereof on which light beams converge from at least first and second directions on opposite sides of said axis and from third and fourth directions on opposite sides of said axis which are substantially at right angles to said first and second directions, the improvement comprising:
    (a) a first light beam deflecting system positioned along said axis including one unit of at least first and second optical prisms, each prism composed of an electrically controllable refractive material, and means for applying the influence of control voltages independently across said prisms for effecting deflections of said beams about said point for directing said beams along said axis, selectively, from said first and second directions;
    (b) a second light beam deflecting system positioned along said axis including first and second units, each having at least first and second optical prisms wherein each prism is composed of an electrically controllable refractive material, and means for applying the influence of control voltages independently across said prisms of the first and second units for effecting deflections of said beams about said point for directing said beams along said axis, selectively, from said third and fourth directions;
    (c) said one unit of the first system being positioned along said axis intermediate said first and second units of the second system, said prisms of said one unit being supported side-by-side so as to provide an interface thereof which intersects said beams adjacent said point;
    (d) said prisms of said first unit of the second system being supported side-by-side so as to provide an interface thereof which intersects said beams before entering said prisms of said one unit;
    (e) said prisms of said second unit of the second system being supported side-by-side so as to provide an interface thereof which intersects said beams after leaving said prisms of said one unit; and
    (f) means for applying the influence of said control voltages, selectively, across said first and second prisms of said first and second systems for establishing accordingly,
        a lower index of refraction in one, or more, of said first prisms in relation to the index of refraction of the second prism adjacent thereto, and/or
        a lower index of refraction in one, or more, of said second prisms in relation to the index of refraction of the first prism adjacent thereto,
    to effect accordingly,
        the direction of a light beam along said axis in response to a deflection of said light beam about said point from either said first, second, third or fourth directions.

2. The invention as set forth in claim 1 additionally including
    (g) a source of light and a beam forming member positioned between said source and said deflection means for forming said light beams into the shape of characters.

References Cited

UNITED STATES PATENTS

| | | | |
|---|---|---|---|
| Re. 26,170 | 3/1967 | Harris | 350—150 |
| 2,942,538 | 6/1960 | Bechtold. | |
| 3,182,574 | 5/1965 | Fleisher | 350—150 |
| 3,329,474 | 7/1967 | Harris et al. | |
| 3,305,292 | 2/1967 | Miller | 350—150 |

OTHER REFERENCES

Kulcke, "A Fast, Digital Indexed Light Deflector," IBM Journal, January 1964, pp. 64–67.

Nelson, "Digital Light Deflection," Bell System Technical Journal, vol. 43, No. 3, May 1964, pp. 821–845.

JEWELL H. PEDERSEN, *Primary Examiner.*

E. S. BAUER, *Assistant Examiner.*